(12) United States Patent
Imamoto et al.

(10) Patent No.: US 12,522,266 B2
(45) Date of Patent: Jan. 13, 2026

(54) TRAIN CONTROL SYSTEM

(71) Applicant: HITACHI, LTD., Tokyo (JP)

(72) Inventors: Kenji Imamoto, Tokyo (JP); Jun Koike, Tokyo (JP)

(73) Assignee: HITACHI, LTD., Tokyo (JP)

(*) Notice: Subject to any disclaimer, the term of this patent is extended or adjusted under 35 U.S.C. 154(b) by 779 days.

(21) Appl. No.: 17/793,684

(22) PCT Filed: Dec. 3, 2020

(86) PCT No.: PCT/JP2020/044997
§ 371 (c)(1),
(2) Date: Jul. 19, 2022

(87) PCT Pub. No.: WO2021/166372
PCT Pub. Date: Aug. 26, 2021

(65) Prior Publication Data
US 2023/0051537 A1    Feb. 16, 2023

(30) Foreign Application Priority Data
Feb. 19, 2020    (JP) ................... 2020-026668

(51) Int. Cl.
*B61L 23/00*    (2006.01)
*B61L 3/16*    (2006.01)

(52) U.S. Cl.
CPC ............. *B61L 23/002* (2013.01); *B61L 3/16* (2013.01); *B60L 2200/26* (2013.01); *B61L 2201/00* (2013.01)

(58) Field of Classification Search
CPC ...... B61L 3/16; B61L 23/002; B61L 2201/00; B60L 2200/26
See application file for complete search history.

(56) References Cited

U.S. PATENT DOCUMENTS

2019/0248392 A1* 8/2019 Bar-Tal ................ B61L 15/009

FOREIGN PATENT DOCUMENTS

| EP | 3750778 A1 | 12/2020 |
| JP | 2015-016759 A | 1/2015 |

(Continued)

OTHER PUBLICATIONS

Extended European Search Report received in corresponding European Application No. 20919380.4 dated Mar. 1, 2024.

(Continued)

*Primary Examiner* — Robert J McCarry, Jr.
(74) *Attorney, Agent, or Firm* — MATTINGLY & MALUR, PC

(57) ABSTRACT

A train control system includes: a sensor unit; a linear feature configured such that sensor information acquired by the sensor unit includes characteristic information and installed on a track where a train travels; a feature recognition unit calculating a difference value between first sensor information and second sensor information by comparison between the first sensor information acquired during forward monitoring by the sensor unit and the second sensor information acquired by the sensor unit when the linear feature is not shielded and recognizing a presence or absence of shielding of the linear feature based on the difference value; an intrusion determination unit determining a presence or absence of an intrusion into the track based on the presence or absence of the shielding and generating an intrusion determination result; and a train control unit controlling the train by generating a train control instruction based on the intrusion determination.

11 Claims, 7 Drawing Sheets

(56) References Cited

FOREIGN PATENT DOCUMENTS

| | | |
|---|---|---|
| JP | 2016-046877 A | 4/2016 |
| KR | 2012-0002221 A | 1/2012 |
| WO | 2019/155621 A1 | 8/2019 |

OTHER PUBLICATIONS

International Search Report of PCT/JP2020/044997 dated Feb. 2, 2021.

* cited by examiner

TRAIN CONTROL SYSTEM

TECHNICAL FIELD

The present invention relates to a train control system that controls a train traveling on a track in accordance with the result of detection of an object around the track.

BACKGROUND ART

In a track transportation system traveling on a track, in a case where there is an object around the track, the object cannot be avoided by steering, and thus detecting the object is important for train safety and operability improvement. Used as obstacle detection means is, for example, a sensor such as a camera, light detection and ranging (LIDAR), and a millimeter-wave radar. Many sensors are problematic in that the detection accuracy and distance of the sensor decrease due to environmental changes in bad weather, at night, and so on.

As for a railroad as a track transportation system, the on-board railroad crossing obstacle detection device described in JP-A-2015-016759 (PTL 1) has been proposed as an obstacle detection device detecting an object around a track, in a railroad crossing in particular. According to the technique disclosed in PTL 1, planar light-emitting means for light emission is provided on a railroad crossing road surface and the presence or absence of an obstacle in the railroad crossing is determined based on the ratio to the maximum light-emitting pixel count of the light-emitting pixel count of an image of the planar light-emitting means taken by a train-mounted camera.

The on-board railroad crossing obstacle detection device of PTL 1 performs bird's-eye view processing on a trapezoidal image of the light-emitting surface of the railroad crossing in a frame image output by the camera to convert the image into a rectangular image, obtains the ratio of the light-emitting pixel count of the rectangular image to the maximum light-emitting pixel count (light-emitting pixel count at the time when the light emission of the rectangular image is not blocked at all), and compares the result of the calculation with a threshold value to determine the presence or absence of the obstacle.

CITATION LIST

Patent Literature

PTL 1: JP-A-2015-016759

SUMMARY OF INVENTION

Technical Problem

However, since the on-board railroad crossing obstacle detection device of PTL 1 performs obstacle detection based on the difference between the maximum light-emitting pixel count and the light-emitting pixel count of the rectangular image resulting from the bird's-eye view processing, the device has the drawback that a decline in the calculation accuracy of the bird's-eye view processing may lead to obstacle non-detection or misdetection. The decline in calculation accuracy results from the following hard-to-avoid factors.

First, as the distance between a train and a railroad crossing increases, the angle of surface light-emitting means imaging becomes shallow and the calculation accuracy of bird's-eye view processing for calculating a rectangular image from a captured trapezoidal image decreases. Second, a decline in calculation accuracy may arise due to a road surface shape (curve, slope, or the like) around a railroad crossing as well as vibration during train traveling.

The present invention has been made in view of the above problems, and an object of the present invention is to provide a simple train control system that highly accurately detects an obstacle around a railroad crossing from a distance and enables safe and stable train control, even at night or in bad weather, on a railway line.

Solution to Problem

In order to solve the above problems, for example, the configuration described in the claims is adopted. The present application includes a plurality of means for solving the above problems. To give an example, a train control system includes: a sensor unit; a linear feature configured such that sensor information acquired by the sensor unit in a case where the linear feature is detected by the sensor unit includes characteristic information and installed on a track where a train travels; a feature recognition unit calculating a difference value between first sensor information and second sensor information by comparison between the first sensor information actually acquired by the sensor unit and the second sensor information acquired by the sensor unit in a case where it is considered that the linear feature is not shielded and recognizing a presence or absence of shielding of the linear feature based on the difference value; an intrusion determination unit determining a presence or absence of an intrusion into the track based on the presence or absence of the shielding and generating an intrusion determination result; and a train control unit controlling the train by generating a train control instruction based on the intrusion determination result and transmitting the train control instruction to the train 10.

Advantageous Effects of Invention

According to the present invention, it is possible to provide a simple train control system that highly accurately detects an obstacle around a railroad crossing from a distance and enables safe and stable train control, even at night or in bad weather, on a railway line.

DESCRIPTION OF EMBODIMENTS

Hereinafter, a train control system according to an embodiment of the present invention will be described with reference to the drawings. First, Example 1 will be described with reference to FIGS. 1 to 6, and then Example 2 will be described with reference to FIG. 7. It should be noted that the train in the following description means a moving body including at least one railroad vehicle for passenger or freight transport and traveling along a track (hereinafter, also referred to as a "railroad track").

Example 1

Figure 1:
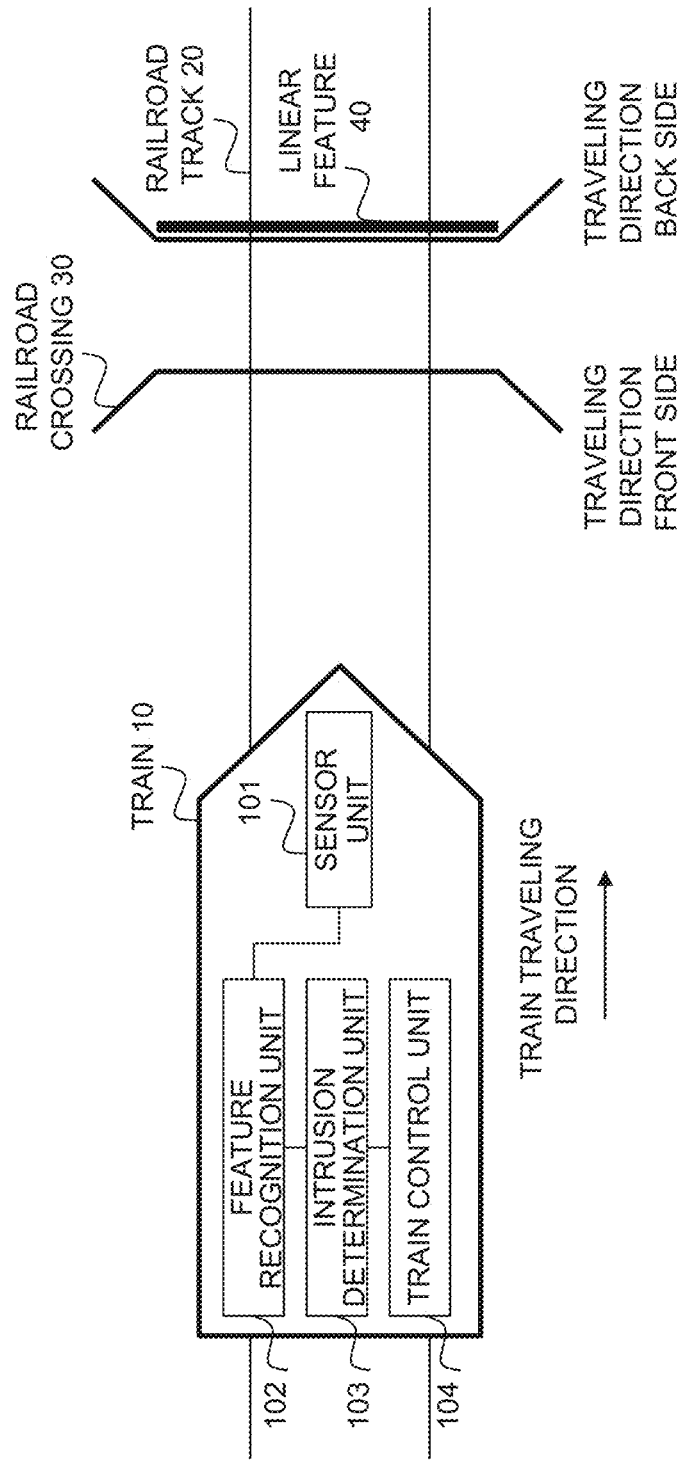
FIG. 1 is a schematic configuration diagram of a train control system according to Example 1 of the present invention.

FIG. 1 is a schematic configuration diagram of the train control system according to Example 1 of the present invention. The train control system of Example 1 illustrated in FIG. 1 is configured to include a train 10, a railroad track (track) 20, a railroad crossing 30, and a linear feature 40. In addition, the train 10 is configured to include a sensor unit 101, a feature recognition unit 102, an intrusion determination unit 103, and a train control unit 104.

The train 10 is provided with a brake device that reduces the traveling speed of the train 10 based on an instruction of the train control unit 104. The railroad crossing 30 is installed at a point where the railroad track 20 and a road intersect at a level and is used for a pedestrian or a car to cross the railroad track. Although the railroad crossing 30 is classified into a plurality of types depending on the presence or absence of a barrier or an alarm, the train control system according to the present invention can be applied regardless of the type of the railroad crossing 30.

The sensor unit 101 acquires sensor information at the time of train forward monitoring using a sensor mounted in the front of the train 10. Desirably, the sensor that is used has a performance suitable for detecting a feature part of the linear feature 40, that is, an identifier. Various means such as a camera, a millimeter-wave radar, LIDAR, and an ultrasonic sensor can be applied as this sensor. In addition, a plurality of the sensors may be used in combination. It should be noted that the identifier is a characteristic function that causes the sensor to recognize being the linear feature 40. In addition, it is assumed that a certain identifier is formed (embodied) in the linear feature 40 in order to adapt to the sensor that is used.

The sensor unit 101 transmits the sensor information obtained during the forward monitoring to the feature recognition unit 102. The sensor information differs depending on the type of the sensor that is used. For example, the sensor information is image information on the object in a case where a camera is used and reflection intensity or distance information on the object in a case where a millimeter-wave radar or LIDAR is used.

It is assumed that the linear feature 40 is orthogonal to the railroad track, installed along the railroad crossing 30, and equivalent to or greater than the monitoring region in length. It is desirable that the linear feature 40 has a feature easily detected by the sensor unit 101. The object that is used as the linear feature 40 is determined by the sensor that is used.

For example, in a case where a camera is used as the sensor, it is desirable to arrange characteristic lighting, a figure, or the like such that the identifier of the linear feature 40 can be easily detected as image information. It is preferable that the lighting is characterized by a wavelength, a color, a blinking frequency, or the like.

It should be noted that in the case of a night-vision camera with lighting extending outside the range of visible light, an identifier by a wavelength that is not a visible color can also be formed. Further, in the case of using a sensor detecting an electromagnetic wave other than a camera, an identifier by the wavelength of the electromagnetic wave can also be formed. It is preferable that the figure is characterized by a special shape, a two-dimensional barcode, or the like.

In the case of using LIDAR or a millimeter-wave radar as the sensor, it is desirable to install, for example, a retroreflective sheet or a reflector for strong laser light or radio wave reflection. In the case of recognizing an automobile or a pedestrian using, for example, a camera or LIDAR, it is difficult to perform distant detection because the reflectance differs depending on the clothes or surface material. On the other hand, as for the linear feature 40, it is also possible to use a known feature that can be detected from a distance. In that case, an increase in distance and ensuring reliability are expectable regarding the sensor detection performance at a distance in particular.

The train control system according to Example 1 is based on the principle of determining the presence or absence of an intrusion into the railroad crossing 30 from the result of detecting whether or not there is a shielding obstacle between the linear feature 40 and the train 10. Regarding this principle, FIG. 2 illustrates an installation example of the linear feature 40 and an operation example in a case where an obstacle shields the linear feature 40.

Figure 2:
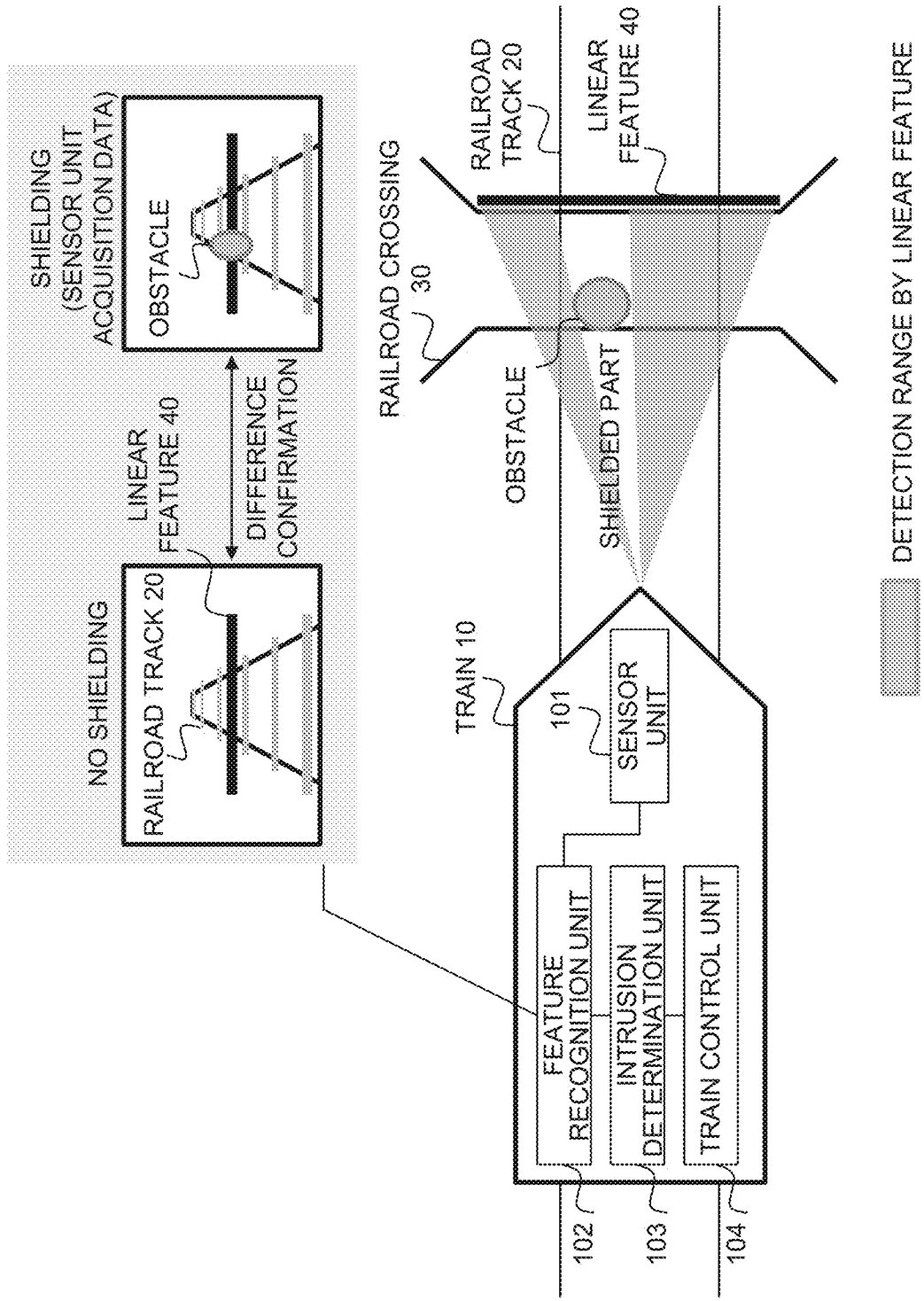
FIG. 2 is an operation explanatory diagram at the time of obstacle detection by the train control system of FIG. 1.

FIG. 2 is an operation explanatory diagram at the time of obstacle detection by the train control system illustrated in FIG. 1. As illustrated in FIG. 2, in order to detect an intrusion in the railroad crossing 30, it is necessary to install the linear feature 40 at least on the back side in the train traveling direction. It should be noted that in the case of a line where the train 10 may travel in both directions, examples of which include a single track, installation on both sides of the railroad crossing 30 is preferable.

However, in a case where the linear features 40 are installed on both sides of the railroad crossing 30, the linear feature 40 installed on the back side in the traveling direction is shielded by the obstacle in the railroad crossing 30 whereas the linear feature 40 installed on the front side is not shielded.

In a case where the distance between the train 10 and the linear feature 40 is long, the linear features 40 on the front side and the back side may appear to be an almost integrated line. Accordingly, the train 10 may misrecognize the linear features 40 on the back side and the front side in the traveling direction and miss the obstacle in the railroad crossing 30.

It is necessary to take measures against the misrecognition in a case where the linear feature 40 is installed in proximity as described above. As a specific measure, it is preferable that the linear feature 40 on the front side and the linear feature 40 on the back side have identifiers of different features. Examples thereof include the method of the front side blinking at 10 Hz and the back side blinking at 15 Hz in a case where lighting is used as the linear features 40. An example is illustrated in FIG. 3.

Figure 3:
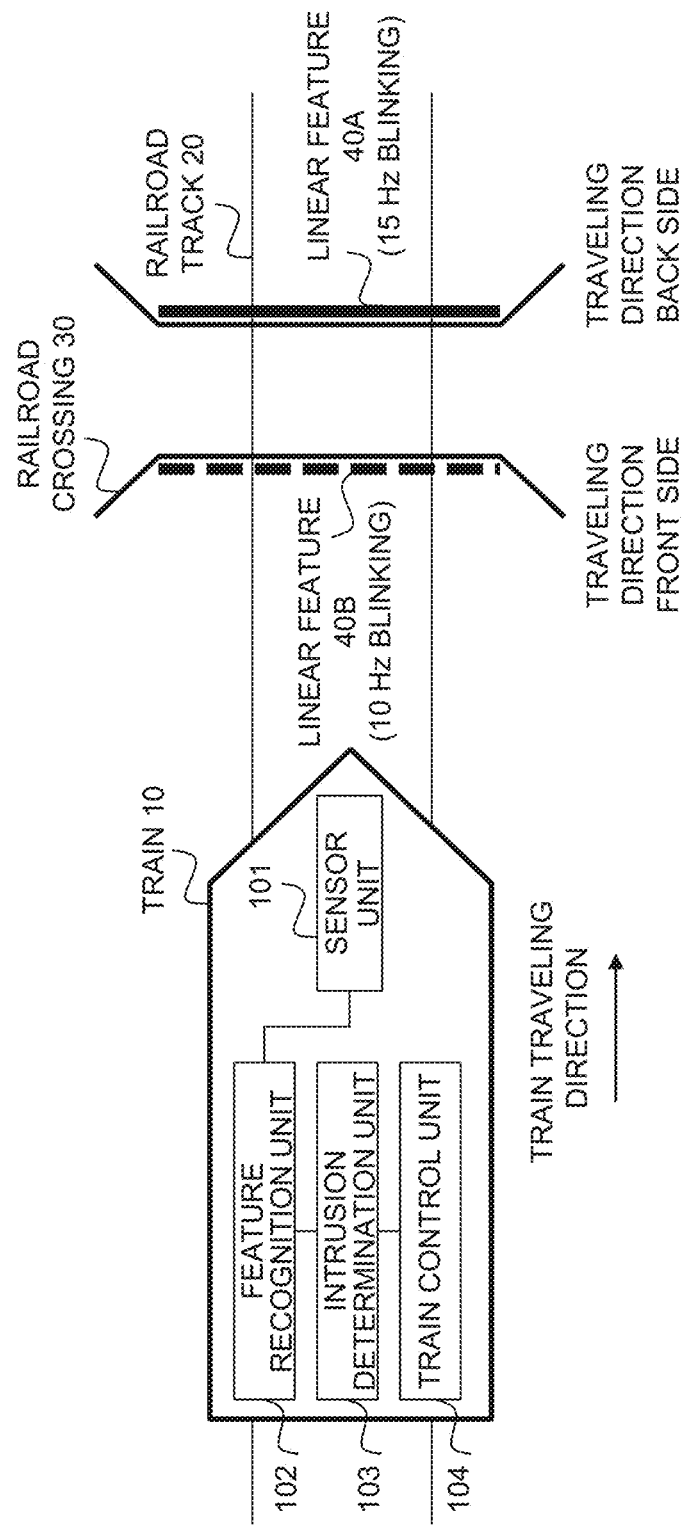
FIG. 3 is a schematic configuration diagram of an example in which linear features are arranged on both the front side and the back side in a train traveling direction with respect to FIG. 1.

FIG. 3 is a schematic configuration diagram of an example in which the linear features 40 are arranged on both the front side and the back side in the train traveling direction with respect to FIG. 1. As illustrated in FIG. 3, as another measure, it is preferable to have the feature of detecting only the linear feature 40 on the back side in the traveling direction from the train 10. For example, it is effective to give the lighting a strong directivity. As one type of the directivity, one possible characterizing method is to make the lighting invisible from the opposite direction by covering the lighting.

Likewise, in the case of using LIDAR or a millimeter-wave radar, one possible method is to install a reflector so as to be unrecognizable (invisible) from a sensor in the opposite direction. As another measure, a feature may be given that is activated in accordance with the traveling direction of the train 10. Examples thereof include the method of turning on the lighting on the back side in the traveling direction and turning off the lighting on the front side in accordance with the traveling direction of the train 10.

Although the linear feature 40 is premised on being installed along the railroad crossing 30, the portion orthogonal to the rail is provided with a gap (not illustrated) so as not to hinder the rolling wheels when the train passes. Not limited to the reason, the linear feature 40 does not necessarily have to have a shape that is continuous as a whole and may have some break. For example, a plurality of objects may be discretely installed to configure the linear feature 40 as a whole.

In the case of the discrete linear feature 40, installation is preferable in which the mutual distance between the plurality of separated objects is narrower than the width of the detection target object. For example, with a pedestrian assumed as the minimum detection target object, the mutual distance between the plurality of objects configuring the linear feature 40 needs to be narrower than the width of the person. Then, it is possible to prevent the intrusion determination unit 103 from not detecting an intrusion.

In addition, the linear feature 40 does not have to be an actual object insofar as the linear feature 40 is embodied so as to be detectable by the sensor that is used. Floodlighting, a projected image, and so on are listed as the linear feature 40 that has an identifier embodied in place of an actual object. For example, a projector having a projection mapping function may be installed around the railroad crossing and the projector may form the linear feature 40 by linear irradiation along the railroad crossing 30. In this case, the linear feature 40 includes a body irradiated with, for example, floodlighting or a projected image from the projector.

As a demand for the linear feature 40 that has an identifier embodied in place of an actual object, measures against covering and fouling attributable to, for example, weeds, snow cover, and flying dust are conceivable. In other words, it is expected that the linear feature 40 will not be affected and hidden even in a case where the ground is covered with dirt, snow, or the like. However, in this case as well, it is necessary to keep sensitive the function of identifying a railroad crossing obstacle as a detection target object.

Although it is assumed that the linear feature 40 is installed on the back side in the train traveling direction, the linear feature 40 does not necessarily have to be configured by only one line. For example, two or more linear features 40 may be installed on the back side of one railroad crossing 30 in the train traveling direction. An installation example thereof is illustrated in FIG. 4.

Figure 4:
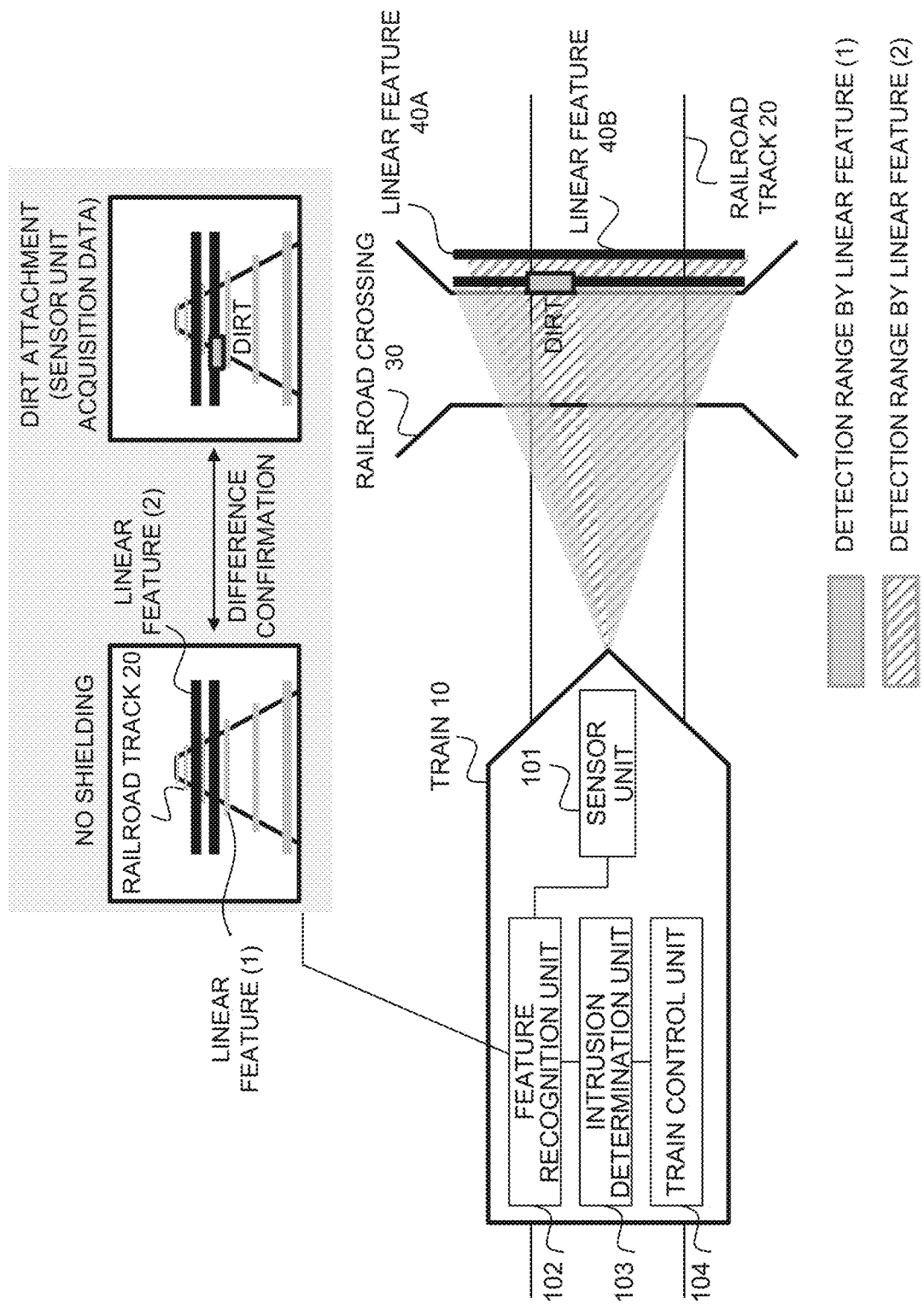
FIG. 4 is a schematic configuration diagram of an example in which the linear features are arranged in two places on the back side in the train traveling direction with respect to FIG. 1.

FIG. 4 is a schematic configuration diagram of an example in which the linear features 40 are arranged in two places on the back side in the train traveling direction with respect to FIG. 1. The effect of installing the two or more linear features 40 illustrated in FIG. 4 is to give redundancy to the system as a whole.

The redundancy of the system as a whole means that one linear feature 40 is complemented by the other linear feature 40, even in a case where the former is damaged or its function deteriorates, regarding the function of intrusion determination. In other words, even in a case where one linear feature 40 fails or becomes dirty or a blind spot occurs due to a trackside structure, intrusion determination can be performed with the other linear feature 40.

At this time, the same material or device may be used or different ones may be used as the plurality of linear features 40 that are installed (for example, lighting and reflector installation). As an effect of using different materials or devices, different sensors (for example, camera and LIDAR) or intrusion determination logics may be applied in recognizing the linear feature 40. In this manner, the reliability of the determination result is expected to be improved by combination between the determination results of a plurality of intrusion determination logics different in properties and performance.

The requirement of installation with respect to the linear feature 40 is that when the linear feature 40 is detected from the sensor unit 101 of the train 10, the detection range covers the range to be protected on the railroad crossing 30. Accordingly, the linear feature 40 is installed along the railroad crossing 30.

However, the linear feature 40 does not necessarily have to be installed at a position close to the railroad crossing 30. For example, the linear feature 40 may be installed in parallel at a position approximately 10 m away from the railroad crossing 30. Even in a case where the railroad crossing 30 and the linear feature 40 are installed at a distance as described above, it is desirable to set the width of the linear feature 40 based on the requirement of installation with respect to the linear feature 40 described above.

The same effect can be obtained by installing the linear feature 40 in a non-railroad crossing place where a pedestrian, an automobile, or the like is assumed to intrude. For example, a fall from a platform can be detected by installation on a station yard railroad track. Here, only a configuration in which the linear feature 40 is installed along the railroad crossing 30 has been described so that the description is facilitated, but the present invention is not limited thereto. The train control system according to Example 1 of the present invention can be applied without limiting the place of installation to the railroad crossing 30.

As described above, various combinations are possible as to the sensor type that is used in the sensor unit 101 and the linear feature 40 that is installed at the railroad crossing 30. The configuration of a case where a camera is mainly used as a sensor will be exemplified below so that the description is simplified. However, detection by the same principle is possible also in a case where various sensors are used without being limited to a camera.

The feature recognition unit 102 recognizes the presence or absence of shielding of the linear feature 40 installed around the railroad crossing 30 based on the sensor information received from the sensor unit 101. Accordingly, the feature recognition unit 102 stores the sensor information obtained from the identifier of the linear feature 40 in advance in a state where there is no obstacle-attributable shielding (when there is no shielding).

The feature recognition unit 102 determines, for example, a threshold value with regard to the difference between the stored sensor information at the time of no shielding and the sensor information obtained during the forward monitoring of the linear feature 40. The feature recognition unit 102 recognizes that there is no shielding if it is determined as a result of the threshold value determination that there is no difference. The feature recognition unit 102 recognizes that there is shielding if it is determined as a result of the threshold value determination that there is a difference.

Generally used as an image difference confirmation method is a background subtraction method using the degree of difference between pixel values in images (luminance difference, color space distance, or the like). For example, in a case where lighting is continuously installed along the railroad crossing 30 as the linear feature 40 and a passenger car is stuck in the railroad crossing 30, lighting break is detected from the camera image of the train 10 (see FIG. 2). The feature recognition unit 102 transmits the sensor information and the shielding recognition result to the intrusion determination unit 103.

The method by which the feature recognition unit 102 recognizes the sensor information obtained from the linear feature 40 when there is no shielding is classified into the following two of first and second methods. By the first method, the sensor information at the time of no shielding obtained from each linear feature 40 is registered in advance in a database and is read out when the difference from the sensor information acquired during the forward monitoring is calculated. By the second method, the identifier itself of each linear feature 40 is given feature information.

At least one of the first and second methods may be applied to the feature recognition unit 102 in the train control system. As specific registration information of the first method, the installation position (kilometer information or the like), length, and color of the linear feature 40, the blinking frequency of lighting, the reflectance of a reflector, or the like may be registered. As a specific example of the second method, in a case where, for example, lighting is used as the linear feature 40, lighting with a different color is used only at an end point in the overall shape of the linear feature 40. For example, lighting with a red end point and a white midpoint may be used.

Figure 5:
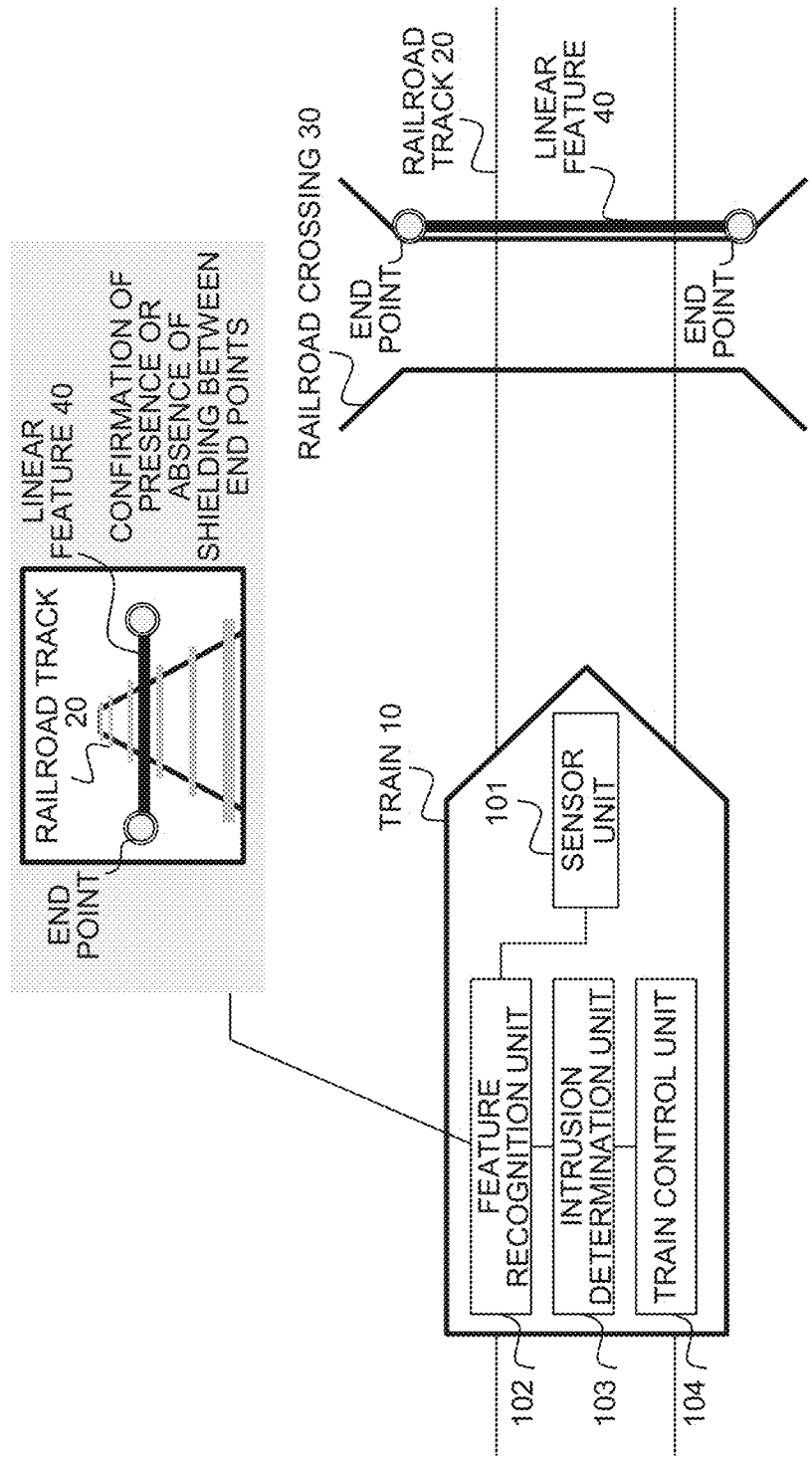
FIG. 5 is a schematic configuration diagram of an example characterized by the relationship between an end point and an intermediate portion of the linear feature with respect to FIG. 1.

FIG. 5 is a schematic configuration diagram of an example characterized by the relationship between the end point and the intermediate portion of the linear feature 40 with respect to FIG. 1. As illustrated in FIG. 5, the feature recognition unit 102 is capable of detecting lighting break by recognizing the end point position of the linear feature 40 from a lighting color image. In addition, as another example, in a case where a barcode image is used as the linear feature 40, barcode break can be detected based on barcode information read with a camera image.

The feature recognition unit 102 confirms the difference of the identifier in the sensor information obtained during the forward monitoring and recognizes the presence or absence of shielding. The feature recognition unit 102 is configured to recognize that there is shielding in a case where there is a difference of a predetermined threshold value or more in recognizing the presence or absence of shielding. The sensitivity of the feature recognition unit 102 increases as the threshold value decreases, and thus it is possible to determine that there is an intrusion and safely control the train even with a slight difference (small shielding). If the feature recognition unit 102 is highly sensitive, oversensitivity may arise and a stable train operation may be hindered by misdetection attributable to slight dirt, sensor shake, or the like.

On the other hand, the sensitivity of the feature recognition unit 102 decreases as the threshold value increases, and thus the intrusion of a small object may be missed although misdetection is expected to decrease. It is desirable that the setting of the threshold value, that is, sensitivity of the feature recognition unit 102 is determined in view of the features of the sensor that is used and the linear feature 40, the intruder assumed for each line, and the degree of risk.

Although the feature recognition unit 102 confirms the difference of the identifier in the sensor information obtained during the forward monitoring and recognizes the presence or absence of shielding, in a case where a difference exceeding the difference attributable to the assumed shielding is observed, it may be determined that an abnormality (failure, malfunction, or the like) of the sensor unit 101 has occurred.

As a specific example, when the railroad crossing 30 is close with the camera failed, it is determined that there is a difference in the entire region of the acquired image. In this case, the difference attributable to normally assumed shielding (for example, a part of the linear feature 40 becoming invisible) is exceeded.

From this phenomenon, the feature recognition unit 102 is capable of estimating that a camera failure has occurred. In a case where it is determined that the sensor unit 101 is abnormal, it is desirable to safely control the train 10 by a brake instruction or a switch to manual operation as in the case of the determination that there is an intrusion.

The feature recognition unit 102 may determine the presence or absence of an obstacle or obstacle position information using past sensor information as well as newly acquired sensor information. For example, the state of operation of the obstacle may be estimated by utilizing a method such as a Kalman filter and using past sensor information as well.

For example, in a case where a linearly moving object is detected from past sensor information, even in the case of incapability of sensor information acquisition at a certain moment, the subsequent processing may be executed with it being estimated that an object is at a position predicted from the past sensor information.

The intrusion determination unit 103 determines the presence or absence of an obstacle intrusion into the railroad crossing 30 based on the shielding recognition result of the linear feature 40 by the feature recognition unit 102 and transmits the intrusion determination result to the train control unit 104. In determining the presence or absence of the intrusion, the degree of reliability of the intrusion determination result may be calculated. It should be noted that the degree of reliability may be calculated using artificial intelligence having a learning function.

Conceivable as criteria in calculating the degree of reliability of the intrusion determination result are, for example, the amount of difference from when there is no shielding (for example, lowering the degree of reliability as the difference decreases), environmental conditions such as weather and time slot (for example, lowering the degree of reliability in rain or at night), the distance between the train 10 and the linear feature 40 (for example, lowering the degree of reliability as the distance increases), and the history of past misdetermination in the section (for example, lowering the degree of reliability in a place that has been prone to misdetermination).

It is premised that the intrusion determination unit 103 determines the presence or absence of an obstacle intrusion into the railroad crossing 30 based on the shielding recognition result of the linear feature 40 by the feature recognition unit 102. As a case of exception application, in a case where the linear feature 40 at the railroad crossing 30 being abnormal (surface dirt, malfunction, or the like) is recognized in advance by the intrusion determination unit 103, the intrusion determination unit 103 may determine that there is no intrusion even in a case where the feature recognition unit 102 recognizes that there is shielding.

In the case of exception application as described above, the intrusion determination using the linear feature 40 does not normally operate at the railroad crossing 30, and thus it is necessary to perform forward monitoring by another complementary means. Specifically, it is conceivable to directly detect a pedestrian or an automobile on the railroad crossing 30 based on the sensor information acquired from the sensor unit 101. It is assumed that the detection distance is shorter in a case where a pedestrian or an automobile on the railroad crossing 30 is directly detected than in a case where the linear feature 40 is detected, and thus it is desirable to use together measures to reduce the train traveling speed as compared with a normal occasion.

Conceivable is an abnormality prediction method by which the intrusion determination unit 103 is capable of recognizing an abnormality of the linear feature 40 in advance. Examples thereof include a case where the following conditions overlap. A first condition is a case where the preceding train 10 recognizes that the linear feature 40 is shielded in approaching the railroad crossing 30. A second condition is a case where the safety of the railroad crossing 30 is confirmed by another complementary means.

In a case where the first condition and second condition overlap, as the abnormality prediction method, there is also the method of the preceding train 10 notifying another train 10 of the abnormality of the linear feature 40 via ground equipment or the like. In addition, the maintenance and inspection result of the railroad crossing 30 may be registered and treated as information on the presence or absence of abnormality of the linear feature 40.

The train control unit 104 controls the train 10 by generating a train control instruction for the train 10 based on the intrusion determination result received from the intrusion determination unit 103. The method of train control by the train control unit 104 is as listed below. The train control unit 104 may transmit a generated braking-driving command to an automatic train operation (ATO) device and control the brake by automatic control.

In addition, the train control unit 104 may prompt manual brake control by presenting an alarm based on the generated braking-driving command to the driver. Whether the train control system is to apply automatic control or manual control may be determined before the train travels or may be manually determined by the driver after travel initiation.

In addition, in a case where accuracy information is received, the train control unit 104 may determine whether to apply automatic control or manual control based on the accuracy information. For example, the system prompting the driver to switch to manual control as appropriate with train control by automatic control usually performed is a conceivable operation. It is preferable to use the degree of reliability of the intrusion determination result as a determination criterion for switching from automatic to manual. In a case where the degree of reliability of the intrusion determination result is lower than a predetermined value, it is determined that the determination by the system may be erroneous and switching from automatic to manual is performed.

It should be noted that examples of specific devices of the braking-driving means of the train 10 include an inverter, a motor, and a friction brake, which are not illustrated. Preferably, in creating a brake instruction, the train control unit 104 determines the strength of the brake based on information such as the train traveling speed, the distance to the railroad crossing 30, and the degree of reliability of the intrusion determination result. For example, conceivable as a method is emergency brake in a case where the distance to an obstacle is short and the traveling speed is high, maximum regular brake in a case where the distance is long, and coasting or powering suppression in a case where the degree of reliability of the intrusion determination result is low.

Even after a brake instruction is created, in a case where the intrusion determination unit 103 determines that there is no intrusion into the railroad crossing 30, the train control unit 104 may generate a brake release instruction and control the train 10. It is preferable that the brake release instruction at that time is generated based on information such as the train traveling speed, the distance to the railroad crossing 30, and the degree of reliability of the intrusion determination result.

Expectable by executing the processing of the train control unit 104 is the effect of avoiding an unnecessary deceleration attributable to brake release. For example, conceivable is a case where the safety of train traveling is confirmed after it is determined that there is an intrusion and a brake instruction is given in the previous processing cycle. The following two are exemplified and listed as the reasons. First, the obstacle may be removed after it is determined that there is an intrusion. Second, a temporary sensor misdetection having occurred may be confirmed.

The train control unit 104 may present an intrusion determination result or brake instruction content to the driver by, for example, cab screen display, voice information, or an alarm instead of directly controlling the train 10 with a brake instruction. Next, the processing of the train control system will be described with reference to FIG. 6.

Figure 6:
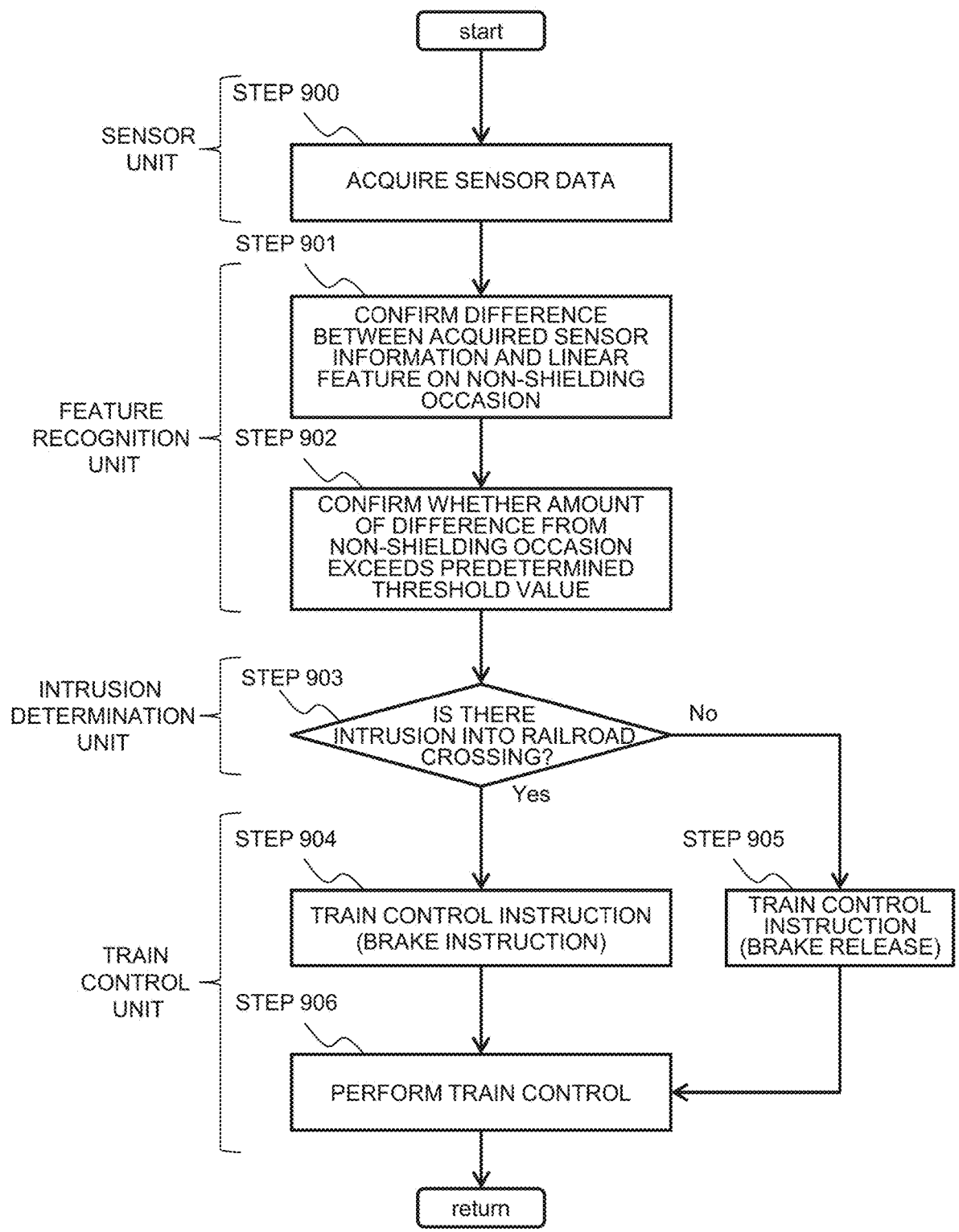
FIG. 6 is a flowchart illustrating the procedure of processing in the train control system of FIG. 1.

FIG. 6 is a flowchart illustrating the procedure of the processing in the train control system of FIG. 1. The processing illustrated in FIG. 6 is executed at regular intervals. Step 900 is executed by the sensor unit 101. Step 901 and Step 902 are executed by the feature recognition unit 102. Step 903 is executed by the intrusion determination unit 103. Step 904 and Step 906 are executed by the train control unit 104.

In Step 900, the current sensor information is acquired from the sensor unit 101. Confirmed in Step 901 is the difference between the sensor information acquired by the sensor unit 101 and the sensor information obtained from the linear feature 40 when there is no shielding.

In Step 902, it is determined whether the difference value of the sensor information confirmed in Step 901 is equal to or greater than a threshold value. In a case where the difference value is equal to or greater than the threshold value, it is determined that there is shielding. In a case where the difference value is less than the threshold value, it is determined that there is no shielding.

In Step 903, the presence or absence of an intrusion into the railroad crossing 30 is determined based on the shielding recognition result. As described above, the presence or absence of the intrusion may be determined with abnormality information on the linear feature 40 at the railroad crossing 30 taken into consideration. In a case where it is determined that there is an intrusion, the processing proceeds to Step 904. In a case where it is determined that there is no intrusion, the processing proceeds to Step 905.

In Step 904 (determination that there is an intrusion into the railroad crossing 30), a brake instruction is generated based on information such as the train traveling speed, the distance to the railroad crossing 30, and the degree of reliability of the intrusion determination result and the train 10 is controlled. An intrusion determination result or brake instruction content may be presented to the driver by, for example, cab screen display, voice information, or an alarm instead of directly controlling the train 10 with a brake instruction.

In Step 905 (determination that there is no intrusion into the railroad crossing 30), in a case where a brake instruction is issued to the train 10 in the previous processing, a brake release instruction is generated based on information such as the train traveling speed, the distance to the railroad crossing 30, and the degree of reliability of the intrusion determination result and the train 10 is controlled.

An intrusion determination result or brake instruction content may be presented to the driver by, for example, cab screen display, voice information, or an alarm instead of directly controlling the train 10 with a brake release instruction. In Step 906, the traveling speed of the train 10 is controlled based on the generated train control instruction content (brake instruction or brake release instruction).

As described above, the train control system according to Example 1 monitors the linear feature 40 arranged along the railroad crossing 30 as a target and performs forward monitoring with the sensor unit 101 mounted on the train 10. The train control system determines the presence or absence of an intrusion in the railroad crossing by recognizing whether or not there is shielding by an obstacle based on the sensor information on the linear feature 40 acquired by the sensor unit 101 and reflects the determination in train control.

This train control system has a configuration in which the positional relationship and mutual functions of the linear feature 40 to be monitored and the sensor unit 101 performing forward monitoring thereon make it easy to maintain the monitoring capability even at night or in bad weather. Accordingly, even at night or in bad weather, an obstacle around the railroad crossing can be highly accurately detected from a distance. As a result, safe and stable train control is possible.

Although a visible camera has been exemplified as the sensor unit 101, the same effect can be obtained from an invisible sensor as exemplified and listed by LIDAR, a millimeter-wave radar, an ultrasonic sensor, an infrared camera, and the like as described above. In addition, the same effect can be obtained in a case where the linear feature 40 is installed at a place other than the railroad crossing 30.

Example 2

Figure 7:
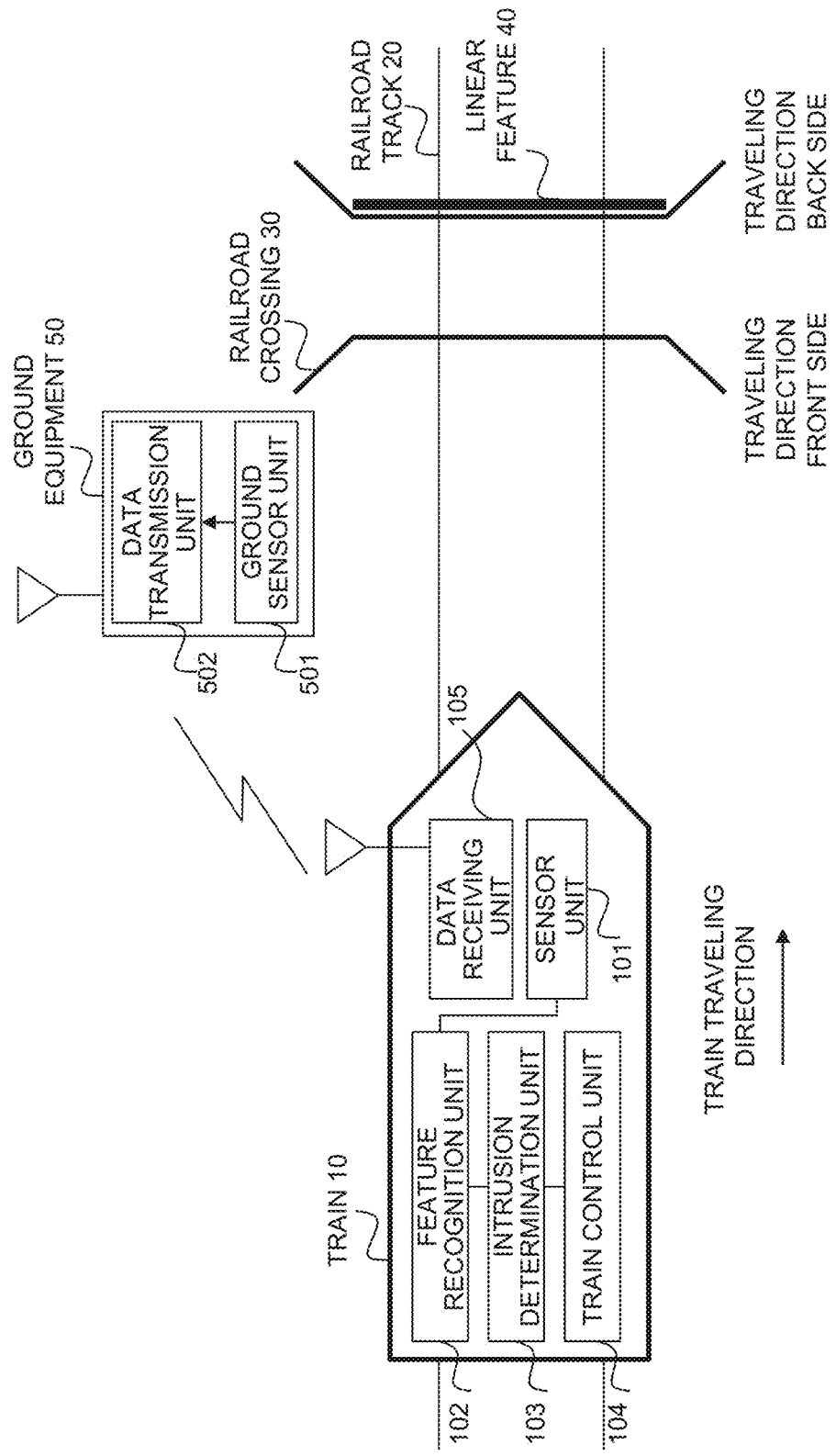
FIG. 7 is a schematic configuration diagram of a train control system according to Example 2 of the present invention.

Hereinafter, Example 2 will be described with reference to FIG. 7. FIG. 7 is a schematic configuration diagram of the train control system according to Example 2 of the present invention. In Example 2 of FIG. 7, a data receiving unit 105 installed at the train 10 and ground equipment 50 installed along a railway line are added as differences from the example of FIG. 1. The ground equipment 50 includes a ground sensor unit 501 and a data transmission unit 502 for ground-vehicle communication.

In the train control system of Example 1, the intrusion determination is performed using the sensor information acquired by the on-board sensor unit 101. On the other hand, in the train control system of Example 2, intrusion determination is performed using sensor information acquired by the ground sensor unit 501 installed along the railway line.

The processing procedure is basically the same as that of Example 1 (FIG. 6), and thus description of the detailed procedure of each step will be omitted. As a difference between Example 1 and Example 2, there is a difference in the processing content of the sensor data acquisition illustrated in Step 900 of FIG. 6. In other words, the ground sensor unit 501 installed along the railway line processes the sensor data acquisition in Example 2 whereas the on-board sensor unit 101 processes the sensor data acquisition in the train control system of Example 1.

The ground sensor unit 501 is a device including a sensor and a controller for detecting an obstacle around the railroad crossing 30. For example, the ground sensor unit 501 may be configured using existing equipment such as a railroad crossing obstacle detection device and a station yard surveillance camera or a new sensor may be installed along the railway line. A camera, a millimeter-wave radar, LIDAR, an ultrasonic sensor, and so on are exemplified and listed as the sensor.

It should be noted that although the ground sensor unit 101 is provided along the railway line in the train control system of Example 2, sensor information from a sensor provided on the vehicle may be used together or no sensor may be provided on the vehicle in another configuration. In addition, the train control system of Example 2 as well as Example 1 has a configuration in which the sensor unit 501, the feature recognition unit 102, the intrusion determination unit 103, and the train control unit 104 are mounted on the vehicle.

However, some or all of the functions of the on-board equipment may be installed on the ground in another form. In other words, a form is conceivable in which the train control system of Example 2 is modified and only the data receiving unit 105 is left in the on-board equipment. As for a train control system in which functions other than the data receiving unit 105 are installed on the ground as described above, the ground equipment acquires sensor information and performs intrusion determination, and then the data transmission unit 502 transmits a train control instruction based thereon to the train 10. In this operation, the train 10 receives only the train control instruction from the ground equipment by the data receiving unit 105 and the train 10 is controlled based thereon.

With the above train control system of Example 2, which is enhanced on the ground equipment side, by utilizing a sensor installed on the ground, it is possible to detect an object even in a range out of sight from the train 10, such as a distant place and a curved section. As a result, a contribution can be made to train operation safety improvement.

The train control system according to the embodiment of the present invention includes various modification examples without being limited to Examples 1 and 2. Examples 1 and 2 have been described in detail in order to describe the present invention in an easy-to-understand manner and are not necessarily limited to one including every described configuration. In addition, it is possible to replace a part of the configuration of one embodiment with the configuration of another embodiment and it is also possible to add the configuration of another embodiment to the configuration of one embodiment.

It should be noted that in the above description, a function has been described with the expression of "kkk unit" (excluding sensor, storage, and processor units). The function of the kkk unit may be realized by a processor unit executing one or more computer programs or may be realized by one or more hardware circuits. The description of each of these functions is an example, and a plurality of functions may be combined into one function or one function may be divided into a plurality of functions.

In addition, the "processor unit" is one or more processors. Although the at least one processor is typically a microprocessor such as a central processing unit (CPU), it may be another type of processor such as a graphics processing unit (GPU).

The at least one processor may be a processor in a broad sense such as a hardware circuit (for example, field-programmable gate array (FPGA) and an application-specific integrated circuit (ASIC)) that performs processing in part or in whole. In addition, the "storage unit" includes one or more memories. The at least one memory in the storage unit may be a volatile memory or a non-volatile memory.

The train control system according to the embodiment of the present invention can be summarized as follows.

[1] The train control system common to Examples 1 and 2 includes the linear feature 40, the sensor unit 101, the feature recognition unit 102, the intrusion determination unit 103, and the train control unit 104. The sensor unit 101 monitors the monitoring target and outputs sensor information. This sensor information includes information for identifying whether the monitoring target is normal or abnormal.

The linear feature 40 may have a simple structure such as a rod simply coated with white paint and is installed on the track where the train 10 travels. The linear feature 40 is to be monitored within the range of the length thereof. Conversely, the length of the linear feature 40 is set to a length equivalent to or greater than the width of the monitoring target that requires monitoring. It should be noted that the "track" and "railroad track" where the train 10 travels can be interpreted as having the same meaning.

The linear feature 40 is configured such that the sensor information acquired by the sensor unit 101 in a case where the linear feature 40 is detected by the sensor unit 101 includes characteristic information. The sensor unit 101 recognizes the presence or absence of shielding between the sensor unit 101 and the linear feature 40. It is considered that there is no shielding if the entire linear feature 40 is recognized. It is considered that there is shielding if a partial defect is recognized at the linear feature 40.

The feature recognition unit 102 calculates the difference value between first sensor information and second sensor information by comparison between the first sensor information and the second sensor information and recognizes the presence or absence of shielding of the linear feature 40 based on the difference value. The first sensor information is information actually acquired by the sensor unit 101 and is acquired during forward monitoring.

The second sensor information is acquired by the sensor unit 101 in a case where it is considered that the linear feature 40 is not shielded, that is, on a non-shielding occasion. The second sensor information is acquired in advance in a state where it is confirmed that the monitoring target is normal.

The intrusion determination unit 103 determines the presence or absence of an intrusion into the track 20 based on the presence or absence of shielding and generates an intrusion determination result. The train control unit 104 controls the train 10 by generating a train control instruction based on the intrusion determination result by the intrusion determination unit 103 and transmitting the train control instruction to the train 10.

For example, the intrusion determination unit 103 determines that there is a railroad crossing obstacle if a simple rod painted in white as the linear feature 40 is recognized by the feature recognition unit 102 as being shorter in length than usual. As a result of this determination, the train control unit 104 controls the train 10 to stop. The processing of monitoring the linear feature 40 such as a simple and clear sign and acquiring the sensor information has an improvement effect with respect to weak points in the on-board railroad crossing obstacle detection device of PTL 1.

First, a decline in calculation accuracy can be reduced because overall simplification is achieved as compared with the case in PTL 1 where pixel count calculation processing is performed by performing bird's-eye view processing on a camera image of the monitoring target. Second, since the monitoring target is simple and clear, a decline in calculation accuracy attributable to vibration during train traveling can be reduced.

This train control system has a simple configuration in which the positional relationship and mutual functions of the linear feature 40 and the sensor unit 101 make it easy to maintain the monitoring capability even at night or in bad weather. Accordingly, even at night or in bad weather, an obstacle around the railroad crossing can be highly accurately detected from a distance and safe and stable train control can be realized.

[2] In the train control system according to Examples 1 and 2, the sensor unit 101 is installed at at least one of the train 10 and the periphery of the track 20. In the train control system according to Example 1 exemplified in FIG. 1 and described later, the sensor unit 101 is arranged at the train 10. In the train control system according to Example 2 illustrated in FIG. 7 and described later, the main function of the sensor unit 101 is arranged on the ground equipment 50 side, but it may be left to some extent on the train 10 side. Alternatively, the functions of the sensor unit 101 may be arranged in an overlapping manner on the ground equipment 50 side and the train 10 side.

[3] In the train control system according to Example 1, the sensor unit 101 is installed at the train 10. The train control system according to Example 1 illustrated in FIG. 1 includes the linear feature 40, the sensor unit 101, the feature recognition unit 102, the intrusion determination unit 103, and the train control unit 104. The linear feature 40 is installed on the track 20. The sensor unit 101 is mounted on the train 10 traveling on the track 20 and has the positional relationship of looking down on the linear feature 40 at a ground height of 2 to 3 m.

The feature recognition unit 102 calculates the difference value between the sensor information acquired by the sensor unit 101 and the sensor information obtained when the linear feature 40 is not shielded and recognizes the presence or absence of shielding of the linear feature 40 based on the difference value. The intrusion determination unit 103 determines the presence or absence of an intrusion into the track 20 based on the presence or absence of shielding and generates an intrusion determination result. The train control unit 104 controls the train 10 by generating a train control instruction based on the intrusion determination result.

The linear feature 40 may be configured, as a simplified and clarified monitoring target, by installing a simple rod painted in white as described above perpendicularly to the railroad track of a railroad crossing. With respect thereto, recognition is performed by the sensor on the approaching train 10 in the process of forward monitoring. Since the sensor unit 101 has the positional relationship of looking down on the linear feature 40 at a ground height of 2 to 3 m, it is unlikely to be affected by weeds or the like and it is easy to acquire sensor information with high accuracy.

[4] In the train control system according to Example 2, a sensor function other than the data receiving unit 105 is arranged in the ground equipment 50. In addition, the linear feature 40, the feature recognition unit 102, the intrusion determination unit 103, and the train control unit 104 are provided. The ground equipment 50 includes the ground sensor unit 501 and the data transmission unit 502. Although the sensor unit 101 illustrated in FIG. 7 is also left on the train 10 side, the sensor unit 101 may not acquire sensor information by itself. The sensor unit 101 of FIG. 7 acquires sensor information via the ground sensor unit 501, the data transmission unit 502, and the data receiving unit 105.

On condition that there is an obstacle at the railroad crossing 30, the ground sensor unit 501 is in a positional relationship so as to sandwich the obstacle with the linear feature 40 at a close distance. Accordingly, with the ground sensor unit 501, sensor information is acquired with ease and high accuracy even in a curved section poorly visible from the on-board sensor unit 101.

In the train control system of Example 2, the sensor information acquired by the ground sensor unit 501 is transmitted to the train 10 by the data transmission unit 502. Alternatively, transmission to the train 10 may be performed by the data transmission unit 502 after the ground equipment 50 performs intrusion determination with sensor information. In that case, the train 10 receives only a train control instruction from the ground equipment 50 by the data receiving unit 105 and the train 10 is controlled based thereon.

As described above, the train control system of Example 2 is different from the train control system according to Example 1 of the above [3] in sensor information acquisition-related function sharing between the ground equipment 50 and the on-board equipment. On the other hand, the train control system of Example 2 is the same as the above [3] in terms of the functions of the feature recognition unit 102 to the train control unit 104.

The train control system of Example 2 has a configuration in which the positional relationship and mutual functions of the linear feature 40 and the ground sensor unit 501 make it easy to maintain the monitoring capability not only at night or in bad weather but also in a curved section with poor visibility in particular.

Accordingly, it is possible to reduce a decline in calculation accuracy attributable to a road surface shape (curve, slope, or the like) around a railroad crossing. For this reason, an obstacle around a railroad crossing can be highly accurately detected from a distance even at night, in bad weather, and in a curved section with poor visibility. As a result, safer and more stable train control can be realized.

[5] The linear feature 40 forms an identifier enabling detection by the sensor unit 101. The identifier has at least one of a visual element and a reflectance element capturing reflectance with respect to irradiation. The visual element has at least one of lighting and a figure.

The lighting of the visual element includes a wavelength, a color, illuminance, and a blinking frequency. The figure of the visual element includes a two-dimensional barcode as well as a shape and a drawing pattern. It is preferable to adopt, as the reflectance element, laser irradiation or radar irradiation for obtaining a strong reflectance with respect to an emitted light ray or electromagnetic wave. It should be noted that an ultrasonic wave is also effective as the reflectance element in a case where the distance between the linear feature 40 and the ground sensor unit 501 is short as in the train control system according to Example 2 of the above [4].

In a case where an automobile or a pedestrian is directly recognized using an existing camera, LIDAR, or the like, it is difficult to perform distant detection because the reflectance differs depending on the clothes or surface material. On the other hand, the linear feature 40 arranged in Examples 1 and 2 of the present invention forms an optimum identifier enabling detection by the sensor unit 101. Accordingly, there is an improvement effect in that an increase in distance and reliability are ensured with respect to the sensor detection performance at a distance.

[6] It is preferable that the linear feature 40 is installed in at least two places. The two places are the front side and the back side in the traveling direction of the train 10 along the railroad crossing 30 crossing the track 20. In addition, it is preferable that the two installed linear features 40 have different identifiers.

In other words, it is preferable that the identifier of the linear feature 40 installed on the front side in the traveling direction and the identifier of the linear feature 40 installed on the back side in the traveling direction are different. As a result, one linear feature 40 is complemented by the other linear feature 40 even in a case where the former is damaged or its function deteriorates. As a result, redundancy can be obtained in the entire system with regard to the function of intrusion determination.

[7] The linear feature 40 is preferably installed in at least two places on the back side in the traveling direction of the train 10 along the railroad crossing 30 crossing the track 20. In addition, the feature recognition unit 102 recognizes that there is no shielding of the railroad crossing 30 in a case where both the following first and second conditions are satisfied.

The first condition is a case where at least one linear feature 40 is shielded. The second condition is a case where the non-shielding state of at least one other linear feature 40 is confirmed. In other words, even if it is determined that one of the linear features 40 installed in the two places is shielded, the overall determination is non-shielding on condition that the other is not shielded. As a result, it is possible to provide the easy-to-use and more realistic train control system.

[8] It is preferable that the feature recognition unit 102 registers a condition for recognizing that the linear feature 40 is not shielded. The registered content is a feature amount of the sensor information acquired by the sensor unit 101. The feature amount has, with regard to the linear feature 40, at least one of an installation position thereof, a visual element, and a reflectance element capturing reflectance with respect to irradiation.

It should be noted that the visual element, the figure as the visual element, and the laser irradiation, the radar irradiation, and the ultrasonic wave as the reflectance elements are as described above. The difference between the registered sensor information in the non-shielding state and the sensor information shielded during the current monitoring can be clearly recognized, and thus a satisfactory determination result can be obtained.

[9] It is preferable that the linear feature 40 illustrated in FIG. 5 is provided with different identifiers at an end point and another part as identifiers enabling the sensor unit 101 to detect an end point of the linear feature 40. It should be noted that the non-end point part refers to the intermediate part of the linear feature 40.

Break in the longitudinal direction can be detected in the linear feature 40 that has an identifier with an end point and the intermediate part distinguished as described above. In other words, in the linear feature 40 as described above, it is possible to recognize the position of the end point and more clearly recognize that somewhere in the longitudinal direction is shielded by a change in the appearance of the intermediate part with reference thereto.

It is preferable that the feature recognition unit 102 recognizes the presence or absence of an abnormality of the sensor unit 101 of the linear feature 40 based on the difference value of the acquired sensor information. The first sensor information is acquired by the sensor unit 101 in the process of monitoring. The second sensor information is acquired in advance when the linear feature 40 is not shielded. It is preferable to calculate and use the difference value between the first sensor information and the second sensor information.

When the railroad crossing 30 is close with the camera failed, the difference attributable to normally assumed shielding is exceeded. In a case where a difference exceeding the difference attributable to the assumed shielding is observed as described above, the feature recognition unit 102 may determine that an abnormality (failure, malfunction, or the like) of the sensor unit 101 has occurred. As a result, the train 10 can be safely controlled by a quick switch to manual operation.

It is preferable that the intrusion determination unit 103 registers abnormality information on the linear feature 40. It is preferable that the abnormality information has at least one of the installation position of the linear feature 40, abnormality information, maintenance information, a train control instruction in a monitoring section, and complementary means information on forward monitoring in the section.

It should be noted that total damage, partial damage, malfunction, and surface dirt are listed as the abnormality information. Listed as the maintenance information are maintenance date and time and maintenance content. Manual operation by a driver and degenerate operation can be listed as the train control instruction in the section. Direct detection of an obstacle using sensor information and visual attention by a driver can be listed as the complementary means information on the forward monitoring in the section.

The intrusion determination unit 103 where the abnormality information on the linear feature 40 is registered is capable of obtaining a more realistic determination result after grasping the actual condition in the current monitoring section. As a result, it is possible to reduce waste such as unnecessarily stopping the train 10 despite not being abnormal.

It is preferable that the intrusion determination unit 103 calculates the degree of reliability of the intrusion determination result using at least one of the following items. The first item is the difference value calculated by the feature recognition unit 102. The second item is an environmental condition including the weather or traveling time slot at the time of traveling of the train 10.

The third item is the distance between the train 10 and the linear feature 40 and the misdetermination history in the section. In addition, it is preferable that the train control unit 104 creates a train control instruction with respect to the train 10 based on the degree of reliability of the intrusion determination result. By utilizing the misdetermination history, it is possible to reduce waste such as unnecessarily stopping the train 10 despite not being abnormal.

It is preferable that the train control unit 104 of the train control system creates a brake release instruction in a case where both the following first and second conditions are satisfied. The first condition is a case where it is determined that there is no intrusion into the track 20 based on newly obtained sensor information after brake instruction output to the train 10.

The second condition is a case where the newly obtained sensor information has at least one of the train traveling speed, the distance from the train 10 to the linear feature 40, and the degree of reliability of the intrusion determination result. As a result, the brake is quickly released immediately after the confirmation of not being abnormal, and thus it is possible to reduce waste such as unnecessarily stopping the train 10 despite not being abnormal.

REFERENCE SIGNS LIST

10: train (vehicle)
20: track (railroad track)
30: railroad crossing
40: linear feature
50: ground equipment
101, 501: sensor unit
102: feature recognition unit
103: intrusion determination unit
104: train control unit
105: data receiving unit
501: ground sensor unit
502: data transmission unit
900 to 906: processing step

The invention claimed is:

1. A train control system comprising:
a sensor unit;
a linear feature having an identifier enabling detection by the sensor unit and installed on a track where a train travels;
a feature recognition unit configured to calculate a difference value between first sensor information and second sensor information by comparison between the first sensor information actually acquired by the sensor unit and the second sensor information acquired by the sensor unit in a case where it is considered that the linear feature is not shielded and recognizing a presence or absence of shielding of the linear feature based on the difference value;
an intrusion determination unit configured to determine a presence or absence of an intrusion into the track based on the presence or absence of the shielding and generating an intrusion determination result; and
a train control unit configured to control the train by generating a train control instruction based on the intrusion determination result and transmitting the train control instruction to the train,
wherein the identifier has at least one of a visual element and a reflectance element configured to capture reflectance with respect to an emitted light ray, electromagnetic wave, or sound wave,
wherein the visual element has at least one of a lighting and a figure,
wherein the lighting has at least one of a wavelength, a color, illuminance, and a blinking frequency,
wherein the figure has at least one of a shape, a drawing pattern, and a two- dimensional barcode,
wherein the reflectance element is at least one of laser irradiation, radar irradiation, and an ultrasonic wave,
wherein the sensor unit is installed at least one of the train and a periphery of a track where the train travels, and
wherein the second sensor information is acquired at a time of no shielding is obtained from the linear feature and registered in advance in a database and the feature recognition unit is configured to read out the second sensor information from the database.

2. The train control system according to claim 1, wherein the sensor unit is installed at the train.

3. The train control system according to claim 1, wherein the sensor unit is installed at the periphery of the track.

4. The train control system according to claim 1 wherein
the linear feature is installed in at least two places on a front side and a back side in a traveling direction of the train along a track-crossing railroad crossing, and
the linear feature installed on the front side and the linear feature installed on the back side are provided with different identifiers.

5. The train control system according to claim 1, wherein
the linear feature is installed in at least two places on a back side in a traveling direction of the train along a track-crossing railroad crossing, and
the feature recognition unit is configured to recognize that there is no shielding of the railroad crossing on condition that both a first condition and a second condition are satisfied in a case where at least one linear feature is shielded as the first condition and an unshielded state of at least one other linear feature is confirmed as the second condition.

6. The train control system according to claim 1, wherein
the feature recognition unit is configured to register a feature amount of the sensor information acquired by the sensor unit in a state where the linear feature is not shielded,
the feature amount has, with regard to the linear feature, at least one of an installation position of the linear feature, a visual element, and a reflectance element capturing reflectance with respect to irradiation.

7. The train control system according to claim 1, wherein the linear feature is provided with different identifiers at an end point and another part as identifiers enabling the sensor unit to detect an end point of the linear feature.

8. The train control system according to claim 1, wherein the feature recognition unit is configured to recognize a presence or absence of an abnormality of a sensor unit of the linear feature based on the difference value.

9. The train control system according to claim 1, wherein
the intrusion determination unit is configured to register abnormality information on the linear feature,
the abnormality information has at least one of an installation position of the linear feature, an abnormal state, maintenance information, a train control instruction in a section related to determination of the intrusion determination unit, and complementary means information on forward monitoring in the section,
the abnormality information has at least one of total damage, partial damage, malfunction, and surface dirt,
the maintenance information has at least one of maintenance date and time and maintenance content,
the train control instruction in the section has at least one of manual operation by a driver and degenerate operation, and
the complementary means information on the forward monitoring in the section has at least one of direct detection of an obstacle using sensor information and visual attention by a driver.

10. The train control system according to claim 1, wherein
the intrusion determination unit is configured to calculate a degree of reliability of the intrusion determination result using at least one of the difference value calculated by the feature recognition unit, an environmental condition including weather or a traveling time slot at a time of traveling of the train, a distance from the train to the linear feature, and a misdetermination history in a section related to determination of the intrusion determination unit, and
the train control unit is configured to create a train control instruction with respect to the train based on the degree of reliability of the intrusion determination result.

11. The train control system according to claim 1 wherein the train control unit is configured to create a brake release instruction on condition that both a first condition and a second condition are satisfied in a case where it is determined that there is no intrusion into the track based on newly obtained sensor information after brake instruction output to the train as the first condition and the newly obtained sensor information has at least one of a train traveling speed, a distance from the train to the linear feature, and a degree of reliability of the intrusion determination result as the second condition.

* * * * *